United States Patent
Hara et al.

(10) Patent No.: US 10,911,391 B2
(45) Date of Patent: Feb. 2, 2021

(54) CLIENT, BROKER, COMMUNICATION SYSTEM, COMMUNICATION METHOD, AND PROGRAM

(71) Applicant: MITSUBISHI HEAVY INDUSTRIES MACHINERY SYSTEMS, LTD., Kobe (JP)

(72) Inventors: Kenta Hara, Tokyo (JP); Rie Hasegawa, Tokyo (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 0 days.

(21) Appl. No.: 16/462,396

(22) PCT Filed: Nov. 25, 2016

(86) PCT No.: PCT/JP2016/084909
§ 371 (c)(1),
(2) Date: May 20, 2019

(87) PCT Pub. No.: WO2018/096641
PCT Pub. Date: May 31, 2018

(65) Prior Publication Data
US 2019/0288975 A1    Sep. 19, 2019

(51) Int. Cl.
*H04L 12/58*    (2006.01)
*H04L 29/06*    (2006.01)
(Continued)

(52) U.S. Cl.
CPC .............. *H04L 51/26* (2013.01); *G06F 13/00* (2013.01); *H04L 51/14* (2013.01); *H04L 63/08* (2013.01);
(Continued)

(58) Field of Classification Search
CPC ........... H04L 25/0228; H04L 25/03866; H04L 27/0006; H04L 27/26; H04L 27/2613;
(Continued)

(56) References Cited

U.S. PATENT DOCUMENTS

2005/0088976 A1* 4/2005 Chafle ..................... H04L 47/15
370/252
2005/0256931 A1* 11/2005 Follmeg .............. H04L 12/1859
709/206
(Continued)

FOREIGN PATENT DOCUMENTS

JP    2014-081872 A    5/2014

OTHER PUBLICATIONS

PCT/ISA/210, "International Search Report for International Application No. PCT/JP2016/084909," dated Feb. 14, 2017.
(Continued)

*Primary Examiner* — Djenane M Bayard
(74) *Attorney, Agent, or Firm* — Manabu Kanesaka; Kenneth Berner; Benjamin Hauptman

(57) ABSTRACT

A client is provided with: a connection processing unit for establishing a first connection for transmitting/receiving a first message and a second connection for transmitting/receiving a second message to and from a broker; a subscription request unit for requesting the broker, using the first connection, with a first topic designated, that the first message associated with the first topic be subscribed, and requesting the broker, using the second connection, with a second topic designated, that the second message associated with the second topic be subscribed; and a message transmission unit for transmitting the first message associated with a third topic to the broker using the first connection and transmitting the second message associated with a fourth topic to the broker using the second connection.

8 Claims, 11 Drawing Sheets

(51) Int. Cl.
*H04L 29/08* (2006.01)
*G06F 13/00* (2006.01)

(52) U.S. Cl.
CPC .......... *H04L 67/26* (2013.01); *H04L 67/2809* (2013.01); *H04L 67/42* (2013.01); *H04L 51/20* (2013.01)

(58) Field of Classification Search
CPC ............. H04L 27/2646; H04L 27/2657; H04L 27/2666; H04L 41/04; H04L 41/08; H04L 41/0806; H04L 41/082; H04L 41/0869; H04L 41/5019; H04L 41/5054; H04L 45/00; H04L 45/50; H04L 45/7453; H04L 47/365; H04L 47/56; H04L 47/801; H04L 47/805; H04L 47/806; H04L 49/9005; H04L 51/046; H04L 51/14; H04L 51/16; H04L 51/18; H04L 51/20; H04L 51/22; H04L 51/26; H04L 51/36; H04L 5/001; H04L 5/0041; H04L 67/02; H04L 67/10; H04L 67/306; H04L 63/08; H04L 67/22; H04L 67/32; H04L 67/42; H04L 67/1097; H04L 67/141; H04L 41/5051; H04L 69/40; H04L 41/0803; H04L 41/5096; H04L 63/0254; H04L 65/601; H04L 65/608; H04L 67/025; H04L 67/04; H04L 67/108; H04L 67/16; H04L 67/20; H04L 67/2838; H04L 67/34; H04L 63/0428; H04L 67/12; H04L 63/166; H04L 63/145; H04L 63/0227; H04L 63/123; H04L 63/0236; H04L 63/0414; H04L 63/1408; H04L 2209/38; H04L 29/06; H04L 63/067; H04L 63/0876; H04L 63/1425; H04L 63/1433; H04L 67/26; H04L 69/14; H04L 69/329; H04L 9/3239; H04L 12/14; H04L 12/18; H04L 12/1813; H04L 2012/40215

See application file for complete search history.

(56) References Cited

U.S. PATENT DOCUMENTS

2017/0222919 A1* 8/2017 Kawazoe ................ H04L 45/44
2018/0115616 A1* 4/2018 Srinivasan ............. H04L 67/32

OTHER PUBLICATIONS

PCT/ISA/237, "Written Opinion of the International Searching Authority for International Application No. PCT/JP2016/084909," dated Feb. 14, 2017.

* cited by examiner

FIG. 3

SUBSCRIPTION LIST                                         D11

| TOPIC | CONNECTION TYPE |
|---|---|
| CLIENT 10a/AUTHENTICATION INFORMATION | CONNECTION A |
| CLIENT 10a/BILLING INFORMATION | CONNECTION A |
| ⋮ | ⋮ |
| ROAD X/TRAFFIC CONGESTION INFORMATION | CONNECTION B |
| ROAD X/SA INFORMATION | CONNECTION B |
| ⋮ | ⋮ |

FIG. 4

ISSUE LIST                                                D12

| TOPIC | CONNECTION TYPE |
|---|---|
| CLIENT 10a/AUTHENTICATION INFORMATION | CONNECTION A |
| CLIENT 10a/BILLING INFORMATION | CONNECTION A |
| ⋮ | ⋮ |
| CLIENT 10a/CURRENT POSITION | CONNECTION B |
| CLIENT 10a/MOVING SPEED | CONNECTION B |
| CLIENT 10a/ACCELERATION | CONNECTION B |
| ⋮ | ⋮ |

FIG. 5

CONNECTION INFORMATION TABLE

| CLIENT ID | CONNECTION TYPE | CONNECTION ID | PASSWORD | MESSAGE ACCUMULATION NECESSITY | SUBSCRIPTION INFORMATION STORAGE NECESSITY |
|---|---|---|---|---|---|
| CLIENT 10a | CONNECTION A | 0001 | ******** | UNNECESSARY | NECESSARY |
| CLIENT 10a | CONNECTION B | 0002 | ******** | NECESSARY | NECESSARY |
| CLIENT 10b | CONNECTION A | 0003 | ******** | UNNECESSARY | UNNECESSARY |
| CLIENT 10b | CONNECTION B | 0004 | ******** | NECESSARY | UNNECESSARY |
| CLIENT 10c | CONNECTION A | 0005 | ******** | UNNECESSARY | UNNECESSARY |
| CLIENT 10c | CONNECTION B | 0006 | ******** | NECESSARY | UNNECESSARY |
| ... | ... | ... | ... | ... | ... |

SUBSCRIPTION INFORMATION TABLE D22

| CLIENT ID | CONNECTION TYPE | TOPIC |
|---|---|---|
| CLIENT 10a | CONNECTION A | CLIENT 10a/BILLING INFORMATION |
| CLIENT 10a | CONNECTION B | ROAD X/TRAFFIC CONGESTION INFORMATION |
| CLIENT 10a | CONNECTION B | ROAD X/SA INFORMATION |
| CLIENT 10b | CONNECTION A | CLIENT 10b/BILLING INFORMATION |
| CLIENT 10b | CONNECTION B | ROAD Y/TRAFFIC CONGESTION INFORMATION |
| SERVER 30a | - | CLIENT 10a/BILLING INFORMATION |
| SERVER 30a | - | ALL CLIENTS/CURRENT POSITION |
| ⋮ | ⋮ | ⋮ |

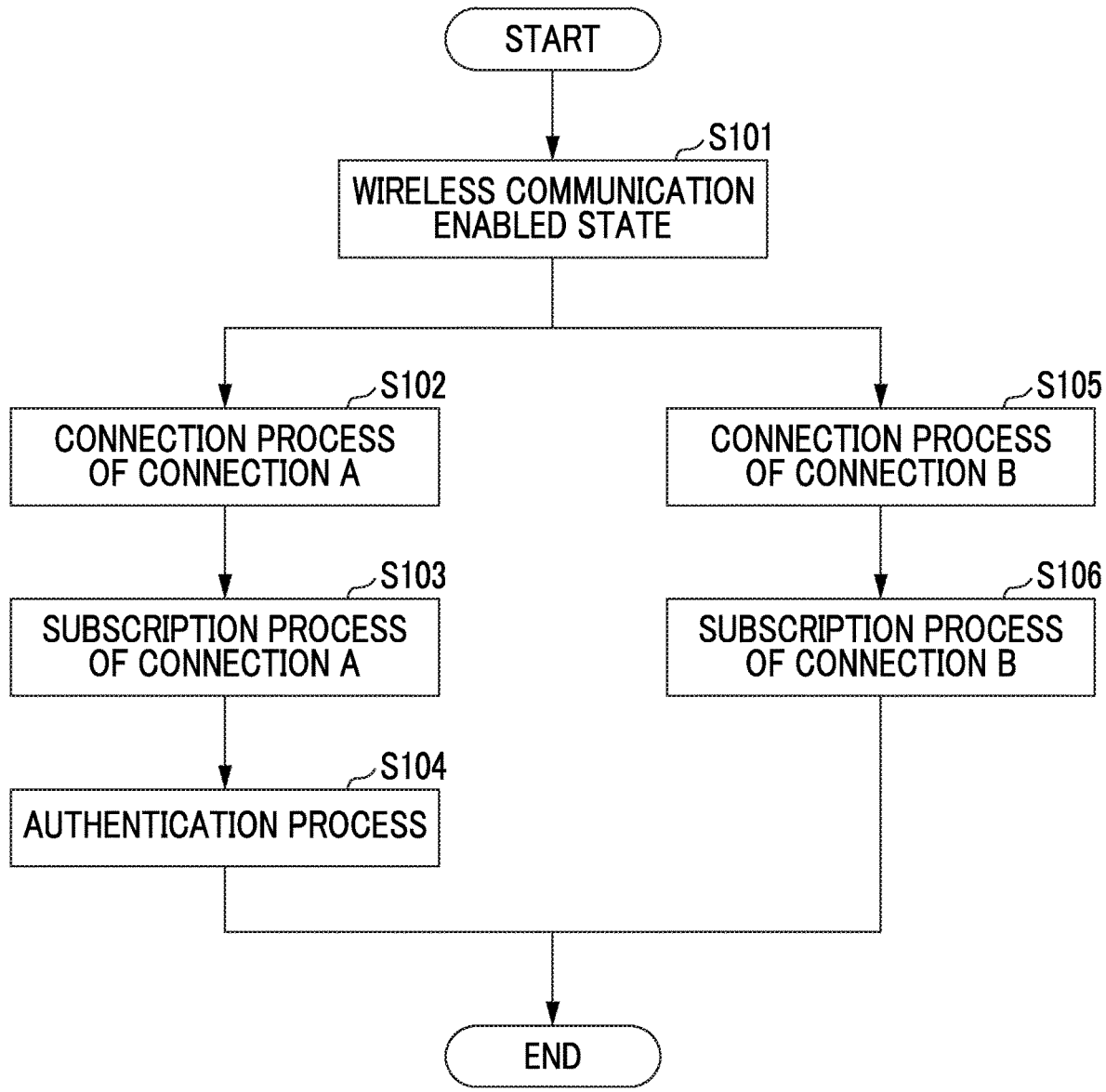

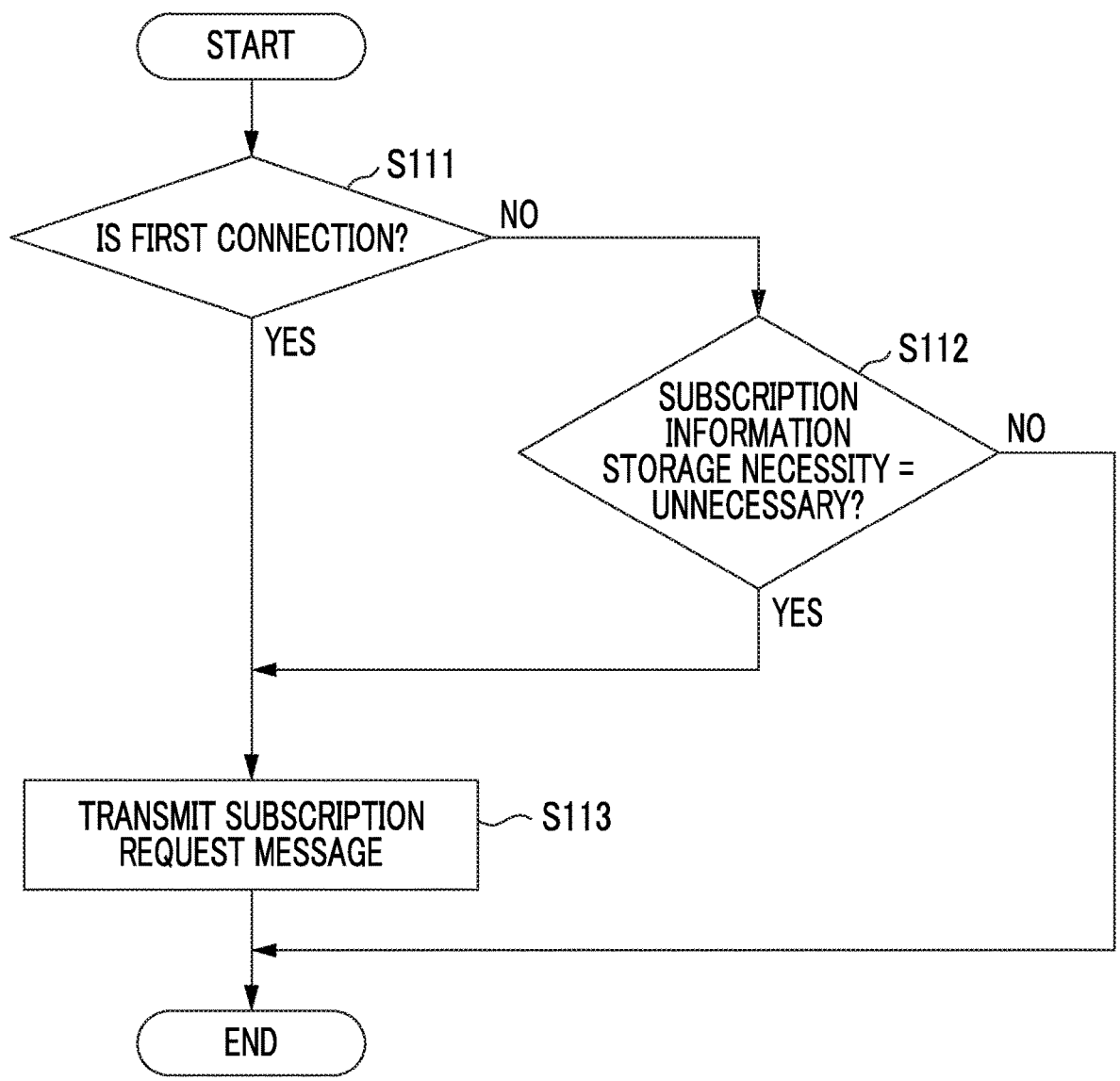

CLIENT, BROKER, COMMUNICATION SYSTEM, COMMUNICATION METHOD, AND PROGRAM

RELATED APPLICATIONS

The present application is National Phase of International Application No. PCT/JP2016/084909 filed Nov. 25, 2016, the disclosure of which is hereby incorporated by reference herein in its entirety.

TECHNICAL FIELD

The present invention relates to a client, a broker, a communication system, a communication method, and a program.

BACKGROUND ART

As a communication system for transmitting and receiving information between a client and a server, for example, PTL 1 discloses a communication system in which a broker (intermediate server) collects vehicle information and the like acquired by a client such as a vehicle-mounted device and transmits the information to the server, and delivers a message transmitted from the server to each client.

CITATION LIST

Patent Literature

[PTL 1] Japanese Unexamined Patent Application Publication No. 2014-81872

SUMMARY OF INVENTION

Technical Problem

In the above-described system, when communication between a client such as a vehicle-mounted device and a broker is disconnected, the client sometimes may miss the opportunity to transmit and receive necessary messages. Therefore, in a communication system using a Publish/subscribe type protocol such as Message Queue Telemetry Transport (MQTT), the broker has a function of accumulating messages transmitted from the server while communication with the client is disconnected, and delivering the accumulated messages in a batch immediately after communication with the client is reconnected.

However, when transmission and reception of a message requiring immediate transmission and acknowledgment, such as an authentication process between the client and the server, for example, are requested during the batch delivery of the accumulated messages, it is not possible to transmit and receive a message corresponding to the request until the batch delivery is completed. As a result, when the capacity of the accumulated messages is large, there is a possibility that the transmission and reception of the message requiring immediate transmission and acknowledgment is delayed and the authentication process or the like cannot be performed within a requested time.

The present invention has been made in view of such a problem, and an object of the present invention is to provide a client, a broker, a communication system, a communication method, and a program, capable of suppressing a delay in transmission and reception of a message requiring immediate transmission by batch delivery of accumulated messages executed at the time of reconnection.

Solution to Problem

According to a first aspect of the present invention, there is provided a client (10) which is connectable to a broker (20), and transmits and receives messages associated with each topic to and from a server (30) through the broker, the client including a connection processing unit (101) that establishes a first connection for transmitting and receiving a first message, and a second connection for transmitting and receiving a second message, among the messages, with the broker; a subscription request unit (102) that requests the broker to subscribe to the first message associated with a first topic, using the first connection, by designating the first topic, and to subscribe to the second message associated with a second topic, using the second connection, by designating the second topic; and a message transmission unit (103) that transmits to the broker, the first message associated with a third topic, using the first connection, and transmits to the broker, the second message associated with a fourth topic, using the second connection.

With such a configuration, even when the broker delivers in a batch the accumulated messages after the broker and the client are reconnected, the client can subscribe to (receive) the messages delivered in a batch using one of the first connection and the second connection, and transmit and receive messages requiring immediate transmission using the other one of the first connection and the second connection in parallel. Therefore, the client can suppress a delay in transmission and reception of messages requiring immediate transmission due to the reception processing of the messages delivered in a batch.

According to a second aspect of the present invention, in the client according to the above-described aspect, the connection processing unit requests the broker to accumulate the second message that the broker is requested to subscribe to, while the second connection is disconnected.

With such a configuration, the client can accumulate the second message in the broker while the second connection with the broker is disconnected. Then, after the second connection is reconnected, the client receives the accumulated second messages delivered in a batch from the broker, thereby suppressing the missing of the second messages.

According to a third aspect of the present invention, the client according to any one of the above-described aspects further includes an authentication processing unit (104) that performs authentication with the server, and after the first connection with the broker is established, the authentication processing unit transmits and receives the first message associated with a topic used for the authentication with the server, using the first connection.

With such a configuration, even when receiving the second messages delivered in a batch from the broker using the second connection, the client can transmit and receive the first messages which are used for the authentication process with the server and need immediate transmission, using the first connection. Thus, there is no delay in transmission and reception of messages related to the authentication process with the server, and it is possible to suppress failure of processing, such as not completing the authentication process within the requested time.

According to a fourth aspect of the present invention, there is provided a broker which is connectable to a client and a server through a network and mediates transmission and reception of messages associated with each topic between the client and the server, the broker including a connection information storage unit (201) that stores as connection information used for connection with the client, connection information of a first connection for transmitting and receiving a first message, and connection information of a second connection for transmitting and receiving a second message, among the messages, for each client; a subscription information storage unit (202) that stores subscription information for linking a first topic and connection information of the first connection and subscription information for linking a second topic and connection information of the second connection, based on a request of the client; and a message delivery unit (203) that based on the subscription information, delivers the first message associated with the first topic to the client using the first connection while the first connection is established, delivers the second message associated with the second topic to the client using the second connection while the second connection is established, and accumulates the second message associated with the second topic while the second connection is disconnected.

With such a configuration, while the first connection and the second connection with the client are disconnected, the broker does not accumulate the first messages but stores the second messages. Therefore, after the first connection and the second connection with the client are reconnected, the broker can perform the batch delivery of the second messages, without performing the batch delivery of the first messages. As a result, after the first connection and the second connection with the client are reconnected, the broker can concurrently perform the delivery of the first messages requiring immediate transmission using the first connection, while continuing the batch delivery of the accumulated second messages using the second connection. Therefore, the broker can suppress a delay in transmission and reception of the first messages requiring immediate transmission due to batch delivery processing of accumulated second messages.

According to a fifth aspect of the present invention, there is provided a communication system including the client according to any one of the above-described aspects; the broker according to the above-described aspect; and a server that transmits and receives a message to and from the client through the broker.

According to a sixth aspect of the present invention, there is provided a communication method of transmitting and receiving messages for each topic between a client and a server through a broker, the method including a step of establishing a first connection for transmitting and receiving a first message, and a second connection for transmitting and receiving a second message, among the messages, between the broker and the client; a step of requesting the broker to subscribe to the first message associated with a first topic, using the first connection, by designating the first topic, and to subscribe to the second message associated with a second topic, using the second connection, by designating the second topic; and a step of transmitting to the broker, the first message associated with a third topic, using the first connection, and transmitting to the broker, the second message associated with a fourth topic, using the second connection.

According to a seventh aspect of the present invention, there is provided a program causing a computer of a client which is connectable to a broker and transmits and receives messages for each topic to and from a server through the broker, to function as: a connection processing unit that establishes a first connection for transmitting and receiving a first message, and a second connection for transmitting and receiving a second message, among the messages, with the broker; a subscription request unit that requests the broker to subscribe to the first message associated with a first topic, using the first connection, by designating the first topic, and to subscribe to the second message associated with a second topic, using the second connection, by designating the second topic; and a message transmission unit that transmits to the broker, the first message associated with a third topic, using the first connection, and transmits to the broker, the second message associated with a fourth topic, using the second connection.

Advantageous Effects of Invention

According to the client, the broker, the communication system, the communication method, and the program, which are described above, it is possible to suppress a delay in transmission and reception of a message requiring immediate transmission due to batch delivery processing of accumulated messages executed at the time of reconnection.

BRIEF DESCRIPTION OF DRAWINGS

FIG. 3 is a diagram showing an example of a subscription list of the client according to the embodiment of the present invention.

FIG. 4 is a diagram showing an example of an issue list of the client according to the embodiment of the present invention.

FIG. 5 is a diagram showing an example of a connection information table of the broker according to the embodiment of the present invention.

FIG. 6 is a diagram showing an example of a subscription information table of the broker according to the embodiment of the present invention.

FIG. 7 is a processing flow for explaining a connection process of the client according to the embodiment of the present invention.

FIG. 8 is a processing flow for explaining a subscription process of the client according to the embodiment of the present invention.

DESCRIPTION OF EMBODIMENTS (Overall Configuration of Communication System)

A communication system according to an embodiment of the present invention will be described with reference to FIG. 1.

Figure 1:
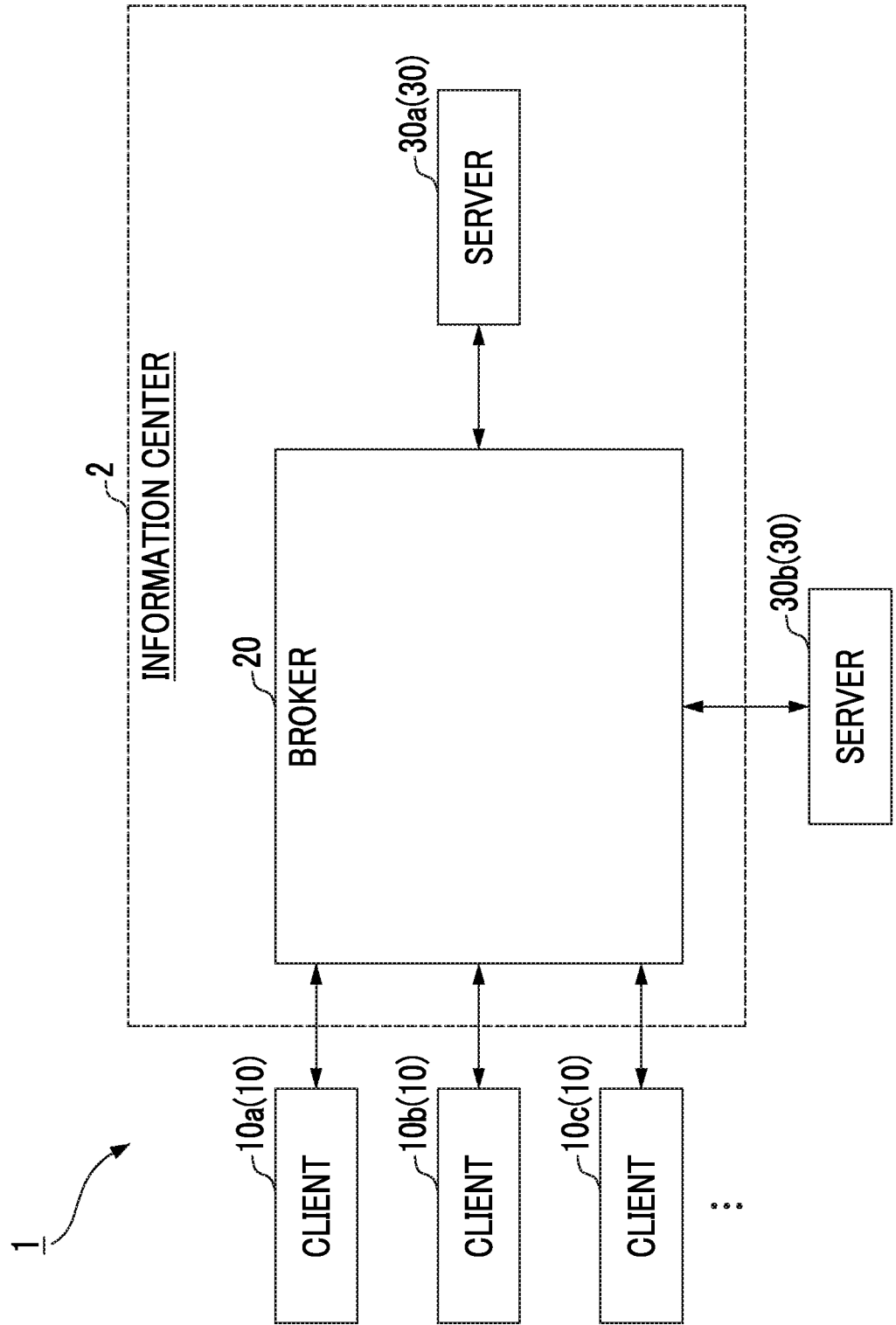
FIG. 1 is a diagram showing an overall configuration of a communication system according to an embodiment of the present invention.

FIG. 1 is a diagram showing an overall configuration of a communication system according to an embodiment of the present invention.

In the present embodiment, the communication system 1 is, for example, a publish/subscribe type communication system using MQTT.

As shown in FIG. 1, the communication system 1 includes a plurality of clients 10a, 10b, 10c, . . . , a broker 20, and a server 30. In the following description, the plurality of clients 10a, 10b, 10c, . . . will be collectively referred to as a client 10.

The client 10 is, for example, a portable communication terminal such as a smartphone, a vehicle-mounted device mounted on a vehicle, or the like. The client 10 is connectable to the broker 20 by wireless communication, and transmits and receives a message to and from the server 30 through the broker 20.

The broker 20 is installed in an information center 2, connectable to the client 10 by wireless communication, and is always connected to the server 30 by wired communication. The broker 20 mediates transmission and reception of messages between the client 10 and the server 30.

The server 30 is always connected to the broker 20 by wired communication or the like, and transmits and receives messages to and from the client 10 through the broker 20.

As shown in FIG. 1, the server 30 is a server 30a installed in the information center 2 in which the broker 20 is also installed. Further, the server 30 may have a server (external server) 30b installed outside the information center 2. At this time, the server 30a and the server 30b may have different functions. For example, the server 30a may have a function of charging a usage fee when the client 10 uses a toll road, and the server 30b may have a function of transmitting congestion information for each road.

Further, the server 30 may have only one server 30a, and the server 30a may have a plurality of functions.

In the communication system 1 of the present embodiment, the vehicle-mounted device 10 and the server 30 function as a publisher that transmits (issues) a message to the broker 20, and a subscriber (client) that receives (subscribes to) a message from the broker 20 as well. Then, the broker 20 mediates transmission and reception of messages between the vehicle-mounted device 10 and the server 30, by collecting messages from the vehicle-mounted device 10 and the server 30 and delivering the message that the vehicle-mounted device 10 and the server 30 request to subscribe to the vehicle-mounted device 10 and the server 30.

When transmitting the message to the broker 20 and when requesting the broker 20 to subscribe to the message, the vehicle-mounted device 10 and the server 30 designate a topic, and make a request for transmission and subscription of messages associated with the topic. The broker 20 collates the topic associated with the message with the topic designated at the time of requesting the subscription from the vehicle-mounted device 10 and the server 30, thereby specifying the vehicle-mounted device 10 and the server 30 as destinations of delivery of each message.

A topic indicates attributes of information included in a message, and one topic is designated for each message. Examples of the topics designated when the client 10 transmits a message include a topic indicating the current position of the client 10, a topic indicating the moving speed, a topic indicating the acceleration, and the like. For example, the client 10 designates a topic indicating the current position, and transmits a message including the information on the current position of the client 10 (latitude, longitude, or the like) to the broker 20.

Further, examples of topics designated when the server 30 transmits a message include a topic indicating congestion information for each road, a topic indicating facility information such as a service area, a topic indicating event information for each region, and the like. For example, the server 30 designates a topic indicating congestion information on the road X, and transmits a message including congestion information (congestion situation, traffic flow, or the like) on the road X to the broker 20.

(Functional Configuration of Client)

Next, the functional configuration of the client 10 will be described with reference to FIGS. 2 to 4.

Figure 2:
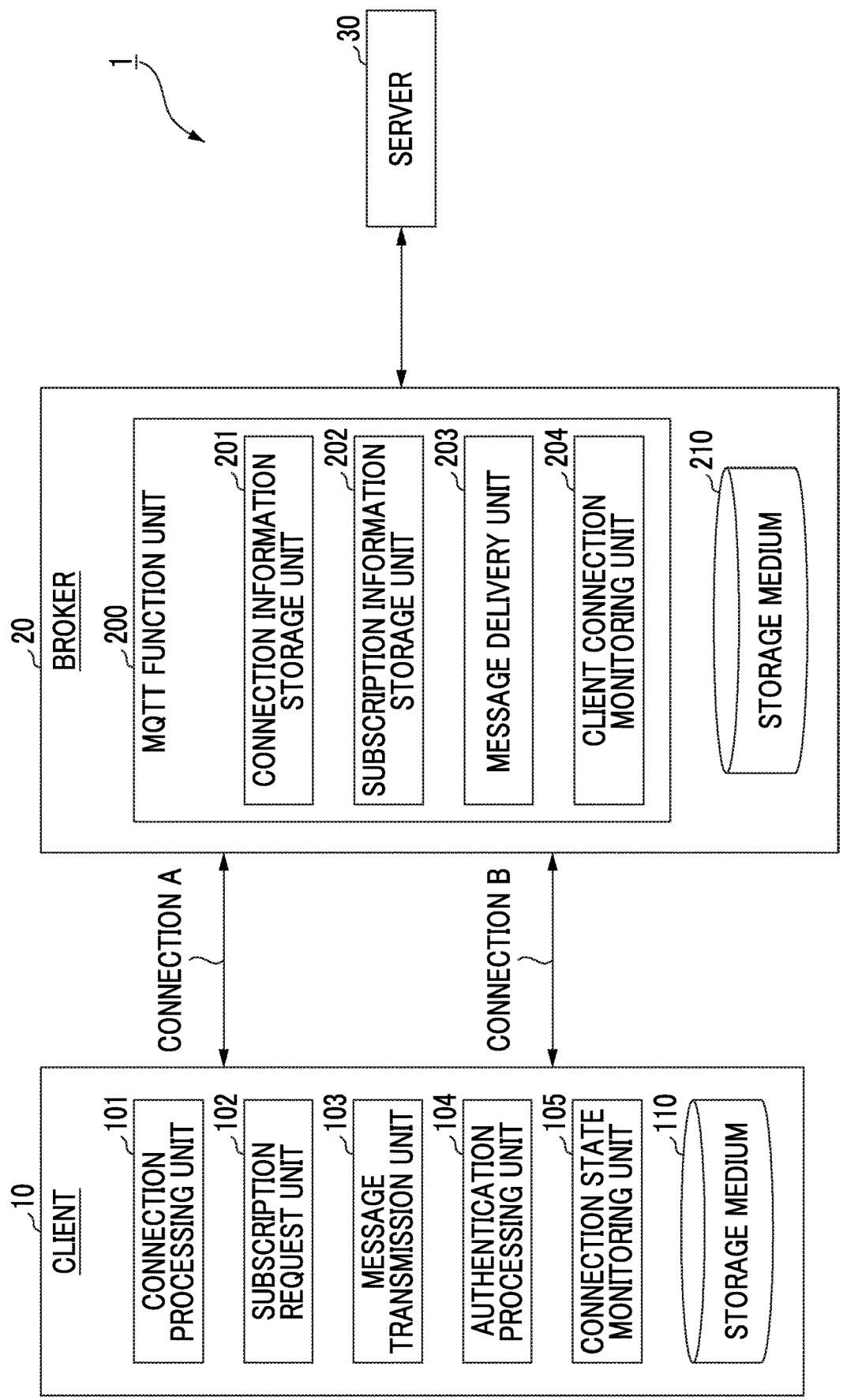
FIG. 2 is a diagram showing functional configurations of a client and a broker according to the embodiment of the present invention.

FIG. 2 is a diagram showing functional configurations of a client and a broker according to an embodiment of the present invention.

As shown in FIG. 2, the client 10 includes a connection processing unit 101, a subscription request unit 102, a message transmission unit 103, an authentication processing unit 104, a connection state monitoring unit 105, and a storage medium 110.

The connection processing unit 101 establishes a wireless communication connection with the broker 20.

In the present embodiment, the connection processing unit 101 establishes two wireless communication connections with the broker 20, that is, a connection A (a first connection) and a connection B (a second connection).

In the present embodiment, the connection A is used for sending and receiving messages that require immediate transmission, acknowledgment, and encryption. For example, in the authentication process for accessing the server 30 or the functions of the server 30 by the client 10, the billing process for paying the fee for use of toll roads, or the like, if required messages are not transmitted and received within a predetermined period, the process is failed. That is, in order to complete the authentication process within a predetermined period, it is necessary to immediately transmit necessary messages between the server and the client 10, and perform transmission confirmation to check whether the message has reliably arrived between the server 30 and the client 10. In addition, since the messages transmitted and received in the authentication process, the billing process, and the like include information specifying the client 10 or the like, it is necessary to encrypt the messages before transmitting and receiving the messages. In this way, the connection A is used to transmit and receive messages associated with an authentication information topic, a billing information topic, and the like, requiring immediate transmission, acknowledgment, and encryption. In the following description, messages that require immediate transmission, acknowledgment, and encryption will be collectively referred to as "urgent message (first message)" and the topic attached to the urgent message as "urgent topic".

On the other hand, the connection B is used for sending and receiving messages that do not require immediate transmission, acknowledgment, and encryption. For example, the client 10 periodically (for example, every 10 seconds) acquires the movement information indicating the moving state of the client 10 such as the current position, the moving speed, and the acceleration, and transmits a message associated with a movement information topic for each client (current position topic, moving speed topic, acceleration topic, or the like) to the broker 20. The server 30 subscribes to and collects messages associated with the movement information topic of each client 10, generates congestion information for each road at predetermined intervals (for example, one hour), based on the movement information, and transmits the congestion information to the broker 20. Further, the client 10 subscribes to a message associated with, for example, a congestion information topic of a road included in the traveling route, and suggests a new moving route or the like as necessary. In such a message associated with the movement information topic or the congestion information topic, it is not necessary to check whether the message has arrived reliably to the client 10 and the server 30. Even when there is a delay in the transmission or reception of such a message, there is no inconveniences such as a failure in processing in the client 10 and the server 30. In this way, the connection B is used to transmit and receive messages associated with a movement information topic, a congestion information topic, and the like, not requiring immediate transmission, acknowledgment, and encryption. In the following description, messages not requiring immediate transmission, acknowledgment, and encryption will be collectively referred to as "normal message (second message)" and the topic attached to the normal message as "normal topic".

In addition, whether to handle a message associated with each topic as "urgent message" or "normal message" may be changed for each communication system 1. For example, in other embodiments, messages associated with a current position topic may be handled as "urgent messages" as encryption is required.

The subscription request unit 102 designates a topic, and requests the broker to subscribe to a message associated with the topic. In the communication system 1 of the present embodiment, topics are predetermined between the server 30 and the client 10, and the subscription request unit 102 may designate a necessary topic among predetermined topics, and transmit a subscription request.

FIG. 3 is a diagram showing an example of a subscription list of a client according to an embodiment of the present invention.

In the present embodiment, as shown in FIG. 3, the subscription request unit 102 stores a subscription list D11 in which a "topic" designating information requesting subscription and a "connection type" used when subscribing to a message associated with the topic are associated with each other in the storage medium 110.

"Connection type" is information indicating which one of the connection A and the connection B is used for subscribing to a message. The subscription request unit 102 sets the connection type based on the content of the message. For example, when the subscription request unit 102 requests subscription of messages for performing an authentication process, a billing process, or the like, the messages are urgent messages that need to be subscribed to without delay. Therefore, the subscription request unit 102 sets the connection A as the connection type for the urgent topic (first topic) used for subscribing to the urgent message. Further, for example, the subscription request unit 102 sets the connection B as a connection type for a normal topic (second topic) used for subscribing a normal message such as congestion information for each road or the like. That is, when the subscription request unit 102 designates an urgent topic (first topic) and request the broker 20 to subscribe to a message, it requests the broker 20 to subscribe to urgent messages associated with the urgent topic using the connection A. Further, when the subscription request unit 102 designates a normal topic (second topic) and request the broker 20 to subscribe to a message, it requests the broker 20 to subscribe to normal messages associated with the normal topic using the connection B.

In addition, the subscription request unit 102 may delete topics that are no longer required to be subscribed, from the subscription list D11.

At least in either of the time of establishing the connection A and the connection B or the time of updating the subscription list D11, the subscription request unit 102 designates the topic and the connection information for the broker 20, and requests the broker 20 to subscribe to a message associated with each topic.

The message transmission unit 103 transmits to the broker 20 a message associated with a topic, for each message, using the connection type (the connection A or the connection B) according to the contents of the message. In the communication system 1 of the present embodiment, topics are predetermined between the server 30 and the client 10, and the message transmission unit 103 transmits to the broker 20, a message associated with a required topic among predetermined topics. In the present embodiment, the message transmission unit 103 transmits the message to be transmitted using the connection A after encrypting it, and transmits the message to be transmitted using the connection B without encrypting it.

FIG. 4 is a diagram showing an example of an issue list of a client according to an embodiment of the present invention.

In the present embodiment, as shown in FIG. 4, the message transmission unit 103 stores an issue list D12 in which a "topic" predetermined according to the content of a message to be transmitted and a "connection type" used when transmitting a message associated with the topic are associated with each other in the storage medium 110.

For example, when transmitting messages for performing an authentication process, a billing process, or the like, these messages are urgent messages that are required to be transmitted without delay. Therefore, the message transmission unit 103 sets the connection A as the connection type for the urgent topic (third topic) used for urgent message transmission. Further, for example, the message transmission unit 103 sets the connection B as a connection type for a normal topic (fourth topic) used for transmission of a normal message such as the moving speed of the client 10. That is, the message transmission unit 103 transmits an urgent message associated with an urgent topic (third topic) to the broker 20 by using the connection A. Further, the message transmission unit 103 transmits a normal message associated with the normal topic (the fourth topic) to the broker 20 by using the connection B.

In addition, the message transmission unit 103 may delete topics that are no longer required to be transmitted, from the issue list D12.

After the connection processing unit 101 completes the connection with the broker 20, the authentication processing unit 104 performs a process for requesting authentication for accessing the server 30 or authentication for accessing functions of the server 30, as necessary.

In the present embodiment, the authentication processing unit 104 handles topics related to the authentication process with the server 30 as "urgent topics". Therefore, all the messages transmitted by the authentication processing unit 104 are encrypted and then transmitted using the connection A. All messages to be subscribed to by the authentication processing unit 104 are subscribed to using the connection A and decrypted by the authentication processing unit 104.

The connection state monitoring unit 105 monitors the state of the wireless communication connection with the broker in the connection A, and the state of the wireless communication connection with the broker 20 in the connection B. In the present embodiment, the connection state monitoring unit 105 monitors whether or not the connection A and the connection B are normally connected.

The storage medium 110 stores various types of information related to communication with the broker 20. The storage medium 110 also stores the subscription list D11 which is updated by the subscription request unit 102 and the issue list D12 which is updated by the message transmission unit 103.

(Functional Configuration of Broker)

Next, the functional configuration of the broker 20 will be described with reference to FIG. 2 and FIGS. 5 and 6.

As shown in FIG. 2, the broker 20 includes an MQTT function unit 200 and a storage medium 210. Further, the MQTT function unit 200 includes a connection information storage unit 201, a subscription information storage unit 202, a message delivery unit 203, and a client connection monitoring unit 204.

FIG. 5 is a diagram showing an example of a connection information table of a broker according to an embodiment of the present invention.

As shown in FIG. 5, the connection information storage unit 201 adds the connection information used for connection with the client 10 to the connection information table D21, and stores it in the storage medium 210.

The connection information table D21 is a table for accumulating, for each client, connection information in which "client ID" capable of specifying the client 10, "connection type", "connection ID" and "password" used for connection with the client 10, "message accumulation necessity", and "subscription information storage necessity" are associated with each other. "Connection type" is a connection type designated by the client 10, and either connection A or connection B is set. "Connection ID" and "password" are information for identifying a combination of the client 10 and the connection type, and different IDs and passwords are set for respect combinations. "Message accumulation necessity" is a setting designated by the client 10, and is a setting of accumulating messages that the client 10 requests subscription, among the messages collected by the broker 20 while the connection with the client 10 is disconnected, and indicating whether or not to transmit in a batch (deliver in a batch) the accumulated messages at the time of reconnection with the client 10. "Subscription information storage necessity" is a setting designated by the client 10, and is a setting indicating whether or not to store subscription information (described later) including the topic that the client 10 is requesting subscription, when connection between the client 10 and the broker 20 is disconnected.

Further, in other embodiments, an aspect may be adopted in which "client ID" and "connection type" are omitted, and only "connection ID" is stored. In this case, the connection information storage unit 201 may not recognize that one client (for example, the client 10a) is connected with the broker 20 by using two connection types, but only recognize that a different connection is made for each connection ID.

FIG. 6 is a diagram showing an example of a subscription information table of a broker according to an embodiment of the present invention.

As shown in FIG. 6, the subscription information storage unit 202 adds subscription information in which a topic and connection information capable of specifying the client 10 and the server 30, which are delivery destinations requesting subscription of the topic, are associated with each other, in the subscription information table D22, and stores it in the storage medium 210. Further, when the connection with the client 10 is disconnected and the "subscription setting storage necessity" of the client 10 is "unnecessary" in the connection information table D21, the subscription information storage unit 202 deletes the subscription information related to the client 10 from the subscription information table D22.

The subscription information table D22 is a table in which connection information capable of specifying the client 10 and the server 30 and a "topic" that the client 10 and the server 30 request subscription are accumulated in association with each other. In the present embodiment, part of the connection information, specifically "client ID" and "connection type" are recorded in the subscription information table D22. Further, in other embodiments, other types of information ("connection ID", "password", or the like) of the connection information may be further recorded in the subscription information table D22.

When "client ID" indicates the server 30, "connection type" may not be set. Further, in other embodiments, an aspect in which "connection ID" is stored instead of "client ID" and "connection type" may be adopted.

Based on the subscription information table D22, the message delivery unit 203 transmits the message transmitted (issued) from the client 10 and the server 30, to the client 10 and the server 30, which are delivery destinations requesting the subscription of the message. The message delivery unit 203 searches for and extracts the delivery destination requesting subscription of each message, from the subscription information table D22, with the topic designated in each message as a key. Then, the message delivery unit 203 delivers the message associated with the topic to the extracted delivery destination. When the delivery destination is the client 10, the message is transmitted to the client 10 by using either the connection A or the connection B, based on the subscription information table D22.

In addition, when the connection with the client 10 requesting subscription of the message is disconnected, and the "message accumulation necessity" is set to "necessary" in the connection information table D21, the message delivery unit 203 stores and accumulates the messages for the topic that the client requests subscription, in the storage medium 210. At the time of reconnection with the client 10, the message delivery unit 203 reads the accumulated messages from the storage medium 210 and delivers the messages in a batch.

The client connection monitoring unit 204 monitors the state of connection with the client 10. In the present embodiment, the client connection monitoring unit 204 monitors whether or not the connection A and the connection B of the client 10 are normally connected respectively.

In the storage medium 210, messages transmitted from the client 10 and the server 30 are stored, and the connection information table D21 updated by the connection information storage unit 201 and the subscription information table D22 updated by the subscription information storage unit 202 are stored.

(Processing at Activation of Client)

Next, a series of flows of a connection process of the client 10 will be described with reference to FIGS. 7 and 8.

FIG. 7 is a processing flow for explaining a connection process of a client according to an embodiment of the present invention.

FIG. 8 is a processing flow for explaining a subscription process of a client according to an embodiment of the present invention.

As shown in FIG. 7, when the client 10 is activated or enters the wireless communication range, the client 10 enters a wireless communication enabled state (S101).

When the client 10 enters the wireless communication enabled state, the connection processing unit 101 of the client 10 performs a connection process of the connection A with the broker 20 (step S102).

Specifically, the connection processing unit 101 transmits a connection request message including connection information of the connection A ("client ID", "connection type (connection A)", "connection ID", "password", "message accumulation necessity" and "subscription information storage necessity") to the broker 20. In the present embodiment, "message accumulation necessity" of the connection A is always set to "unnecessary (the message is not accumulated)". As a result, in the connection A, the broker 20 does not accumulate the message and does not deliver the accumulated messages in a batch, so it is possible to transmit and receive urgent messages without delay. Upon receiving a response message to the connection request message from the broker 20, the connection processing unit 101 ends the connection process of the connection A and proceeds to the next step.

When the connection A is established, the subscription request unit 102 of the client 10 performs a subscription process of the message to be subscribed to using the connection A, based on the subscription list D11 (FIG. 3) stored in the storage medium 106 (step S103).

Specifically, as shown in FIG. 8, the subscription request unit 102 firstly determines whether or not the connection A with the broker 20 is the first time (step S111). When the connection A with the broker 20 is not the first time (step S111: NO), the subscription request unit 102 determines whether "subscription information storage necessity" of the connection A is set to "unnecessary (not stored)" (step S112). When the "subscription information storage necessity" of the connection A is set to "necessary" (step S112: NO), the subscription information related to the connection A of the client 10 is stored in the broker 20, so the subscription request unit 102 ends the subscription process.

On the other hand, when the connection A with the broker 20 is the first time (step S111: YES) or when the "subscription information storage necessity" of the connection A is set to "unnecessary" (step S112: YES), the subscription information related to the connection A of the client 10 is not stored in the broker 20, so the subscription request unit 102 transmits a subscription request message to the broker 20 (step S113). At this time, the subscription request unit 102 extracts topics whose "connection type" is "connection A" from among the topics stored in the subscription list D11. Then, the subscription request unit 102 transmits a subscription request message including the extracted "topic", "client ID", and "connection type (connection A)" to the broker 20.

In the example of FIG. 3, the subscription request unit 102 extracts an authentication information topic and a billing information topic as a topic whose "connection type" is "connection A", from the subscription list D11. Then, the subscription request unit 102 designates the extracted authentication information topic and billing information topic, and transmits to the broker 20, a message requesting subscription of messages associated with each topic using the connection A.

Upon receiving a response message to the subscription request message from the broker 20, the subscription request unit 102 ends the subscription process of the connection A and proceeds to the next step.

Next, as shown in FIG. 7, the authentication processing unit 104 performs an authentication process for accessing the server 30 or accessing the functions of the server 30 (step S104).

Specifically, the authentication processing unit 104 specifies the authentication information topic of the client 10, based on the issue list D12 stored in the storage medium 110, and transmits the message using the connection A. At this time, the authentication processing unit 104 encrypts and transmits the message.

In addition, upon receiving the message (the response message transmitted from the server 30) associated with the authentication information topic of the client 10 from the broker 20, the authentication processing unit 104 decrypts the message and analyzes the contents of the message. When a response to the message from the server 30 is necessary, the authentication processing unit 104 further encrypts the message associated with the authentication information topic and transmits the encrypted message using the connection A.

As described above, the authentication processing unit 104 performs an authentication process with the server 30 by transmitting and receiving a message associated with the topic related to the authentication of the client 10 to and from the server through the broker 20. When the authentication processing unit 104 completes the authentication process, the process proceeds to the next step.

Further, when the client 10 enters the wireless communication enabled state, the connection processing unit 101 of the client 10 performs a connection process of the connection B with the broker 20 (step S105).

Specifically, the connection processing unit 101 transmits a connection request message including connection information of the connection B ("client ID", "connection type (connection B)", "connection ID", "password", "message accumulation necessity" and "subscription information storage necessity") to the broker 20. In the present embodiment, a description will be made in a mode in which "message accumulation necessity" of the connection B is set to "necessary (accumulated)". Thus, the client 10 accumulates in the broker 20, messages associated with the topic that the client 10 requests subscription, among the messages transmitted while the connection B with the broker 20 is disconnected, and can receive in a batch the accumulated messages after reconnection of the connection B. In another embodiment, the setting of "message accumulation necessity" may be changed for each client.

Upon receiving a response message to the connection request message from the broker 20, the connection processing unit 101 ends the connection process of the connection B and proceeds to the next step.

When the connection B is established, the subscription request unit 102 of the client 10 performs a subscription process of the topic to be subscribed to using the connection B, based on the subscription list D11 stored in the storage medium 106 (step S106).

Specifically, similarly to the subscription process of connection A (step S103), the subscription request unit 102 determines whether or not connection of connection B with the broker 20 shown in FIG. 8 is the first time (step S111), and determines whether or not "subscription information storage necessity" of the connection B is set to "unnecessary (not stored)" (step S112). When the connection B with the broker 20 is not the first time (step S111: NO) or when the "subscription information storage necessity" of the connection B is set to "necessary" (step S112: NO), the subscription information related to the connection B of the client 10 is stored in the broker 20, so the subscription request unit 102 ends the subscription process.

On the other hand, when the connection B with the broker 20 is the first time (step S111: YES) or when the "subscription information storage necessity" of the connection B is set to "unnecessary" (step S112: YES), the subscription information related to the connection B of the client 10 is not stored in the broker 20, so the subscription request unit 102 transmits a subscription request message to the broker 20 (step S113). At this time, the subscription request unit 102 extracts topics whose "connection type" is "connection B" from among the topics stored in the subscription list D11. Then, the subscription request unit 102 transmits a subscription request message including the extracted "topic", "client ID", and "connection type (connection B)" to the broker 20.

In the example of FIG. 3, the subscription request unit 102 extracts a congestion information topic of a road X and a service area (SA) information topic of a road X, as topics whose "connection type" is "connection B", from the subscription list D11. Then, the subscription request unit 102 designates the extracted congestion information topic of the road X, and the SA information topic of the road X, and transmits to the broker 20, a message requesting subscription of messages associated with each topic using the connection B.

Upon receiving a response message to the subscription request message from the broker 20, the subscription request unit 102 ends the subscription process of the connection B.

As described above, the subscription request unit 102 performs the subscription process in each of the connection A and the connection B, thereby subscribing to messages using different connections depending on the contents of the messages such that the "urgent message" is subscribed to in the connection A and the "normal message" is subscribed to in the connection B.

The processing flow of FIG. 7 is an example, and the order of processing is not limited to this. For example, the subscription process may not be performed only once after connection A and connection B are established, but may be performed a plurality of times. That is, the subscription request unit 102 may change the topic to be subscribed to according to the state of the client 10, and may perform the subscription process and transmit the subscription request message to the broker 20 each time the topic is changed. Specifically, the subscription request unit 102 may change the subscription list D11, by adding the congestion information topic of the road Y where the client 10 is located, to the subscription list D11, based on the current position of the client 10, and deleting the congestion information topic of the road X through which the client 10 has passed, from the subscription list D11. Then, when the subscription list D11 is changed, the subscription request unit 102 transmits a subscription request message to the broker 20.

For example, when receiving the message from the server 30 in order to perform a billing process on a toll road, the subscription request unit 102 adds the billing information topic related to the billing process to the subscription list D11. At this time, the subscription request unit 102 determines the billing information topic as "urgent topic", and sets the connection type to "connection A". By doing so, when the connection with the broker 20 is established immediately before performing the billing process on the toll road, even when the batch delivery of messages associated with the congestion information topic, accumulated from the broker 20, is performed at the same timing as the billing process, the client 10 transmits and receives messages associated with the billing information topic using the connection A, and performs the batch delivery of messages associated with the congestion information topic using the connection B. Since this prevents the transmission and reception of the messages associated with the billing information topic from being delayed due to the batch delivery, the client 10 and the server 30 can reduce the possibility that the client 10 passes through the toll gate of the toll road before the transmission and reception of messages necessary for the billing process are completed.

(Connection Monitoring Process of Client and Broker)

Next, a connection monitoring process of the client 10 and the broker 20 will be described with reference to FIG. 9.

Figure 9:
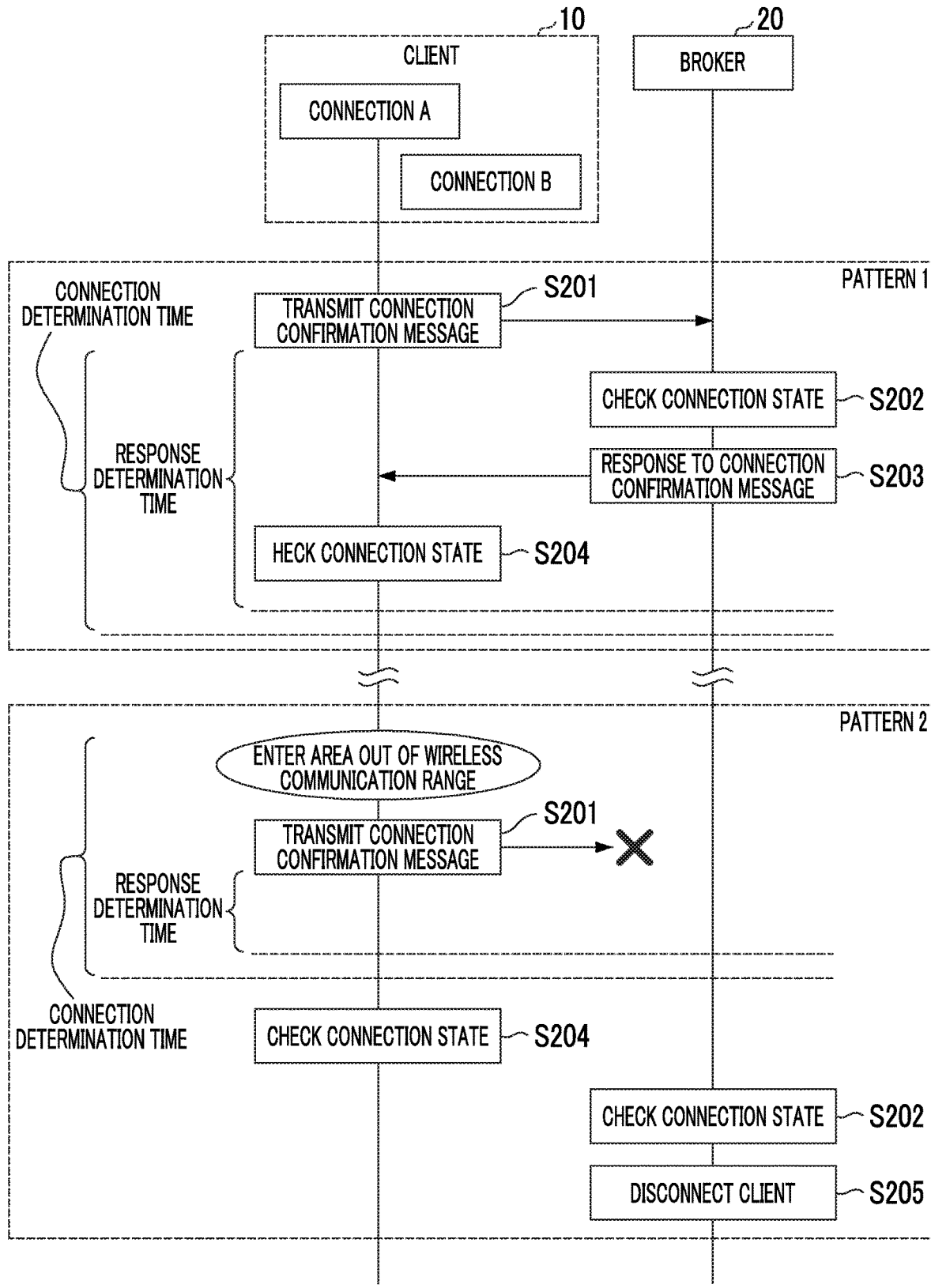
FIG. 9 is a processing flow for explaining a connection monitoring process of the client and the broker according to the embodiment of the present invention.

FIG. 9 is a processing flow for explaining a connection monitoring process of a client and a broker according to an embodiment of the present invention.

Hereinafter, the connection monitoring process of the connection A of the client 10 will be described as an example, but the same connection monitoring process is performed for the connection B of the client 10.

Pattern 1 in FIG. 9 is an example showing the flow of connection monitoring process when the client 10 is located within the wireless communication range.

When the connection A is established with the broker 20, the connection state monitoring unit 105 of the client 10 transmits a connection confirmation message to the broker 20 using the connection A at every predetermined connection determination time (for example, 60 seconds) (step S201).

When the connection A is established with the client 10, the client connection monitoring unit 204 of the broker 20 checks the state of connection with the client 10, based on whether or not the connection confirmation message has been received, using the connection A within the connection determination time (step S202). When receiving the connection confirmation message from the client 10, the client connection monitoring unit 204 of the broker 20 determines that the connection with the client 10 is normally maintained. At this time, the client connection monitoring unit 204 of the broker 20 transmits a response message to the connection confirmation message to the client 10 (step S203).

The client 10 receives the response message from the broker 20 within a predetermined response determination time (for example, 5 seconds) after transmitting the connection confirmation message, thereby determining that the connection A is normally connected (step S204).

On the other hand, Pattern 2 in FIG. 9 is an example showing the flow of connection monitoring process when the client 10 is located outside the wireless communication range, such as underground.

When the client 10 enters the area out of the wireless communication range, the connection state monitoring unit 105 of the client 10 transmits a connection confirmation message (step S201), but the connection confirmation message does not reach the broker 20 because it is out of the wireless communication range. Therefore, since the response message is not returned from the broker 20 within the response determination time, the connection state monitoring unit 105 of the client 10 determines that the connection A has been disconnected (step S204).

Further, the client connection monitoring unit 204 of the broker 20 checks the state of connection with the client 10, based on whether or not the connection confirmation message has been received, using the connection A within the connection determination time (step S202). In the example of the pattern 2, since the connection confirmation message cannot be received from the client 10 within the connection determination time, the broker 20 determines that the connection A of the client 10 is not normally connected, and disconnects the connection A of the client 10 (step S205).

The client 10 and the broker 20 repeat the above-described connection monitoring process for each of the connection A and the connection B to determine whether or not each of the connection A and the connection B is normally connected.

(Message Process by Broker)

Next, a message process of the broker 20 will be described with reference to FIGS. 10 and 11.

Figure 10:
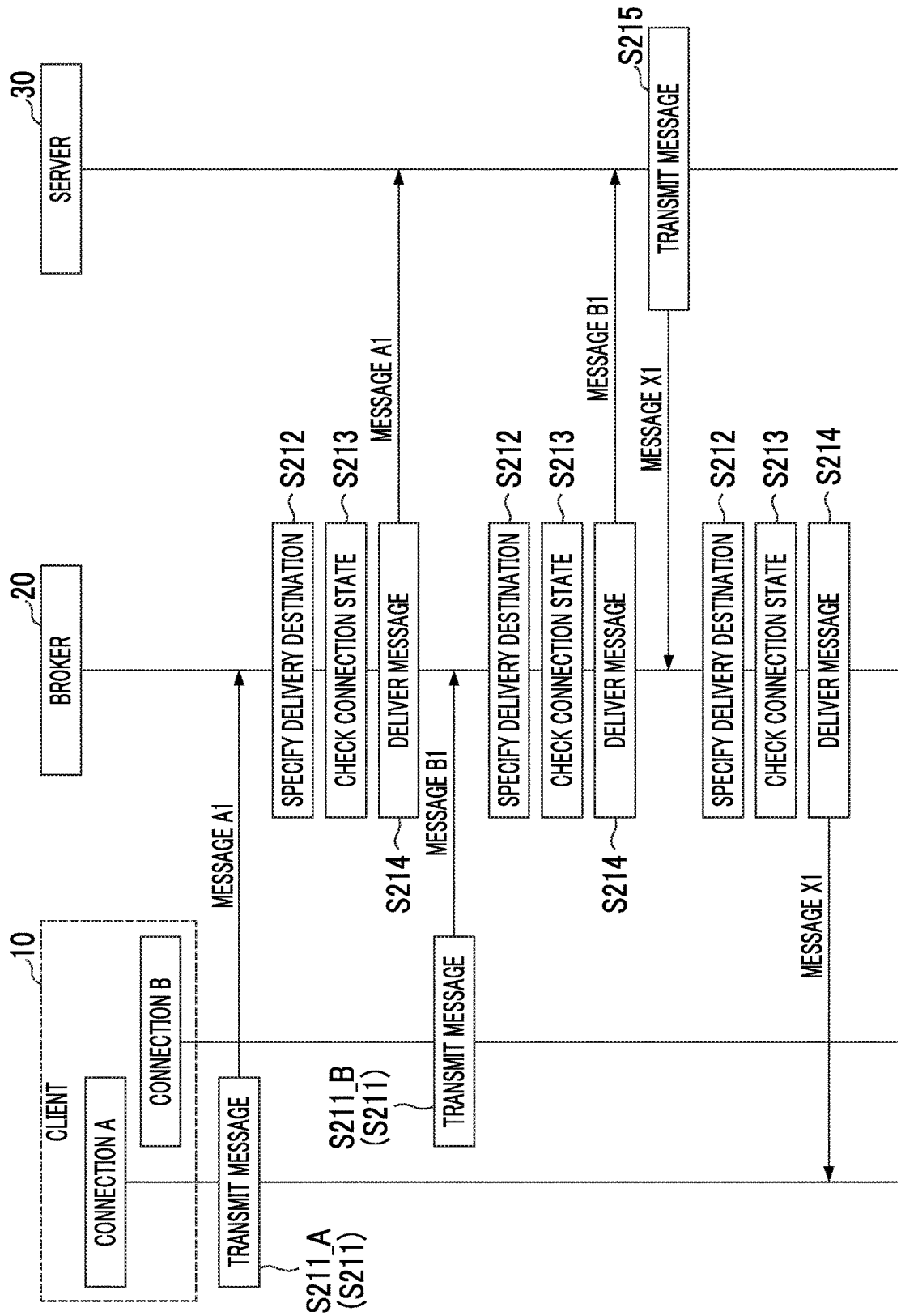
FIG. 10 is a first processing flow for explaining a message process by the broker according to the embodiment of the present invention.

FIG. 10 is a first processing flow for explaining a message process by a broker according to an embodiment of the present invention.

First, a message process in a state where the client 10 and the broker 20 are normally connected will be described with reference to FIG. 10.

When a message is transmitted from the client 10, the message process is performed as follows.

The message transmission unit 103 of the client 10 designates the topic and the connection type (connection A and connection B) set for the topic, based on the issue list D12 (FIG. 4), and transmits the message to the broker (step S211). For example, when transmitting the "message A1" associated with the billing information topic, the message transmission unit 103 of the client 10 transmits the "message A1" to the broker 20 using the connection A, based on the issue list D12 (step S211_A). At this time, the message transmission unit 103 of the client 10 encrypts the "message A1" to be transmitted using the connection A, and then transmits the message.

Upon receiving the "message A1" from the client 10, the message delivery unit 203 of the broker 20 specifies the delivery destination of the "message A1", based on the subscription information table D22 (FIG. 6) (step S212).

When specifying the delivery destination (for example, the server 30) requesting the subscription of the billing information topic designated in the "message A1", the message delivery unit 203 of the broker 20 checks whether or not the delivery destination is normally connected (step S213).

Then, when the delivery destination is normally connected, the message delivery unit 203 of the broker 20 delivers "message A1" to the delivery destination (server 30) (step S214).

Further, when transmitting the "message B1" associated with the current position topic of the client 10, the message transmission unit 103 of the client 10 transmits the "message B1" to the broker 20 using the connection B, based on the issue list D12 (step S211_B). At this time, the message transmission unit 103 of the client 10 transmits the message without encrypting the "message B1" to be transmitted using the connection B.

Upon receiving the "message B1" from the client 10, the message delivery unit 203 of the broker 20 specifies the delivery destination of the "message B1" based on the subscription information table D22 (step S212).

When specifying the delivery destination (for example, the server 30) requesting the subscription of the current position topic of the client 10 designated in the "message B1", the message delivery unit 203 of the broker 20 checks whether or not the delivery destination is normally connected (step S213).

Then, when the delivery destination is normally connected, the message delivery unit 203 of the broker 20 delivers "message B1" to the delivery destination (server 30) (step S214).

When a message is transmitted from the server 30, the message process is performed as follows.

For example, the server 30 transmits "message X1" associated with the billing information topic, as a response to "message A1" which has been received earlier (step S215).

Upon receiving the "message X1" from the server 30, the message delivery unit 203 of the broker 20 specifies the delivery destination of the "message X1" based on the subscription information table D22 (FIG. 6) (step S212).

When the message delivery unit 203 of the broker 20 specifies the delivery destination (for example, the connection A of the client 10) requesting the subscription of the client billing information topic designated in the "message X1", the message delivery unit 203 of the broker 20 checks whether or not the delivery destination is normally connected (step S213).

Then, when the delivery destination is normally connected, the message delivery unit 203 of the broker 20 delivers "message X1" to the delivery destination (connection A of the client 10) (step S214).

In the present embodiment, since the broker 20 and the server 30 are always connected, the message delivery unit 203 of the broker 20 may omit step S213 of checking the connection state when the delivery destination is the server 30.

Figure 11:
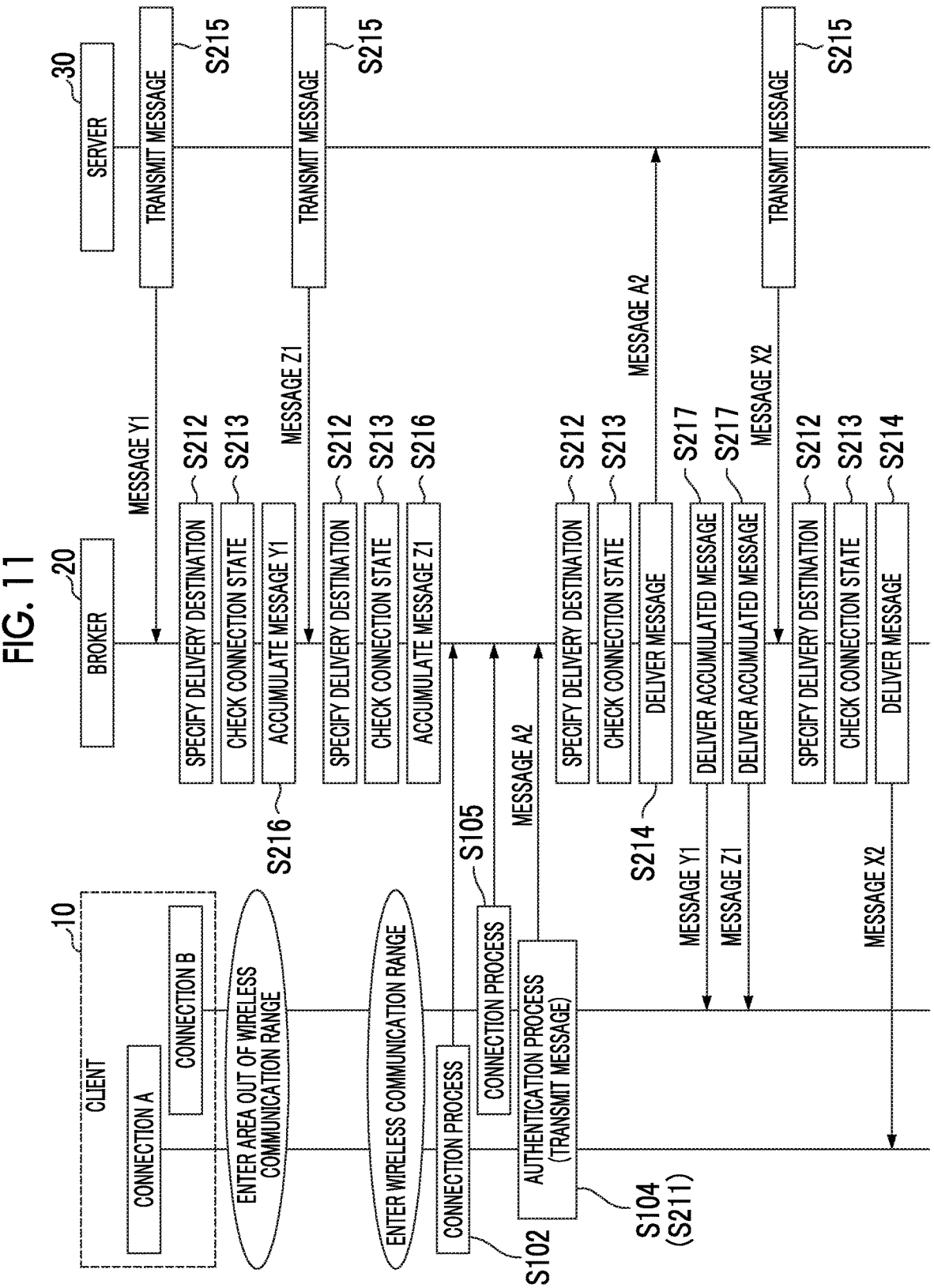
FIG. 11 is a second processing flow for explaining the message process by the broker according to the embodiment of the present invention.

FIG. 11 is a second processing flow for explaining a message process by a broker according to an embodiment of the present invention.

Next, a message process in a state where the connection between the client 10 and the broker 20 is disconnected will be described with reference to FIG. 11.

For example, it is assumed that the client 10 moves out of the wireless communication range such as underground, and connection A and connection B are disconnected. At this time, when the server 30 transmits the "message Y1" associated with the congestion information topic (step S215), similarly to the flow of FIG. 10, the message delivery unit 203 of the broker 20 specifies the delivery destination of the "message Y1" (step S212), and checks the connection state of the delivery destination (step S213). When the connection B of the client 10, which is the delivery destination of the "message Y1", is disconnected, the message delivery unit 203 of the broker 20 stores and accumulates the "message Y1" in the storage medium 210 (step S216).

Similarly, when the server 30 transmits the "message Z1" associated with the service area (SA) information topic (step S215), the message delivery unit 203 of the broker 20 performs the same processes (step S212 and step S213), and when the delivery destination (connection B of the client 10) is disconnected, the "message Z1" is stored and accumulated in the storage medium 210 (step S216).

When the client 10 moves to the wireless communication range, the connection processing unit 101 of the client 10 performs the connection process and the subscription process of the connection A and the connection B (steps S102 and S103 and steps S105 and S106 in FIG. 7). In FIG. 11, the subscription process is not shown.

When the connection A and the connection B are established, the authentication processing unit 104 of the client 10 transmits, as the authentication process (step S104 of FIG. 7), the "message A2" associated with the authentication information topic of the client 10 (step S211).

Similarly to the flow of FIG. 10, the message delivery unit 203 of the broker 20 specifies the delivery destination of the "message A2" (step S212), checks the connection state of the delivery destination (step S213), and delivers the "message A2" to the delivery destination (server 30) (step S214).

When the "message X2" associated with the authentication information topic is transmitted from the server 30 as a response to the "message A2" (step S215), the message delivery unit 203 of the broker 20 performs the same process as described above, and delivers the "message X2" to the client 10 using the connection A (steps S212 to S214).

In parallel with the delivery of the message ("message X2") associated with the authentication information topic of the connection A of the client 10, the message delivery unit 203 of the broker 20 delivers in a batch the normal messages accumulated in the storage medium 210.

More specifically, when the connection B of the client 10 is established, the message delivery unit 203 of the broker 20 reads messages ("message Y1" and "message Z1") associated with the topic that the client 10 requests subscription using the connection B, among the messages accumulated in the storage medium 210, and delivers in a batch these accumulated messages (step S217).

By doing so, even when the accumulated normal messages are delivered in a batch from the broker 20, the client 10 can subscribe to the normal messages delivered in a batch using the connection B, in parallel with transmission and reception of urgent messages such as messages associated with the authentication information topic using the connection A. This makes it possible to prevent the process requesting immediacy such as an authentication process from failing due to delays in transmission and reception of urgent messages by batch delivery of normal messages.

(Hardware Configuration of Client and Broker)

Next, the hardware configuration of the client 10 and the broker 20 of the present embodiment will be described with reference to FIG. 12.

Figure 12:
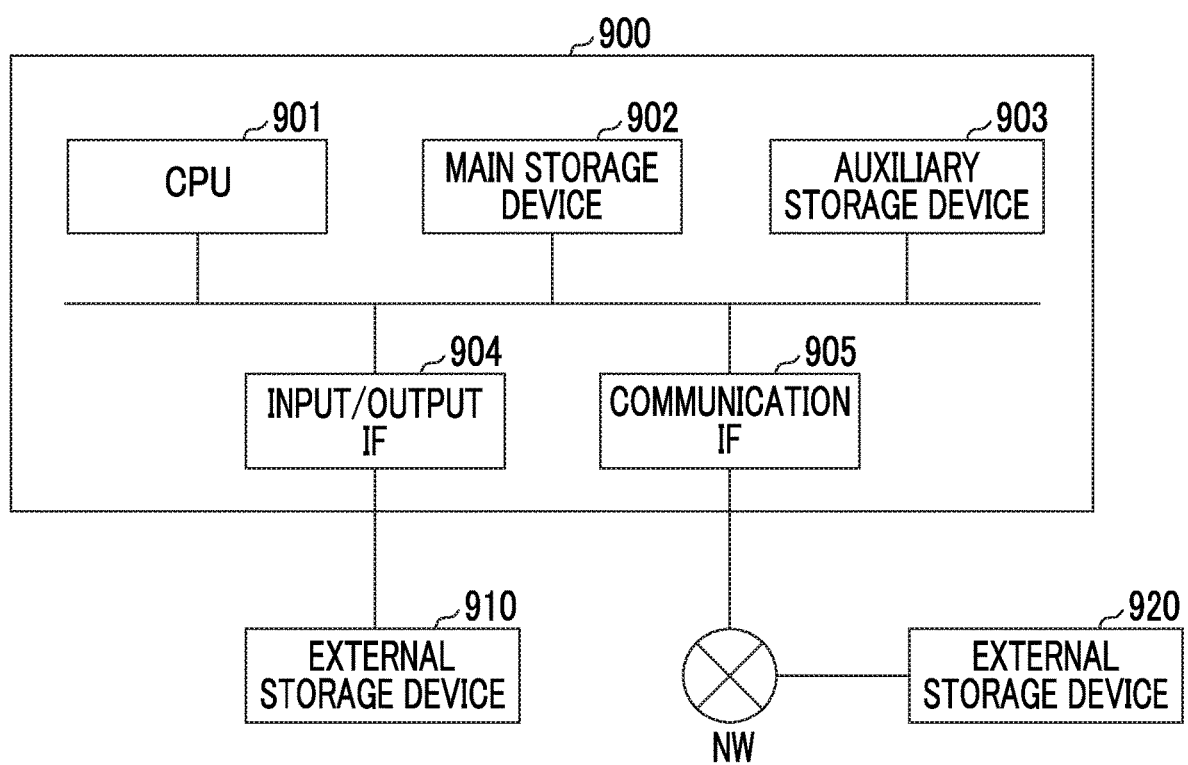
FIG. 12 is a diagram showing a hardware configuration example of the client and the broker according to the embodiment of the present invention.

FIG. 12 is a diagram showing a hardware configuration example of a client and a broker according to an embodiment of the present invention.

A computer 900 includes a CPU 901, a main storage device 902, an auxiliary storage device 903, an input and output interface 904, and a communication interface 905.

The client 10 described above is mounted on the computer 900. Similarly, the broker 20 described above is mounted on a computer 900 different from the computer on which the client 10 is mounted. The operations of the respective processing units of the client 10 and the broker 20 described above are stored in the auxiliary storage device 903 of each computer 900 in the form of a program. The CPU 901 reads the program from the auxiliary storage device 903, develops the program into the main storage device 902, and executes the above process according to the program. Further, the CPU 901 of the client 10 secures the storage area corresponding to the storage medium 110 in the main storage device 902, in accordance with the program, and the CPU 901 of the broker 20 secures the storage area corresponding to the storage medium 210 in the main storage device 902 in accordance with the program. The CPU 901 secures a storage area for storing data under processing in the auxiliary storage device 903 in accordance with the program. Further, the computer 900 is connected to the external storage device 910 through the input and output interface 904, and the storage area corresponding to the storage medium 110 of the client 10 or the storage medium 210 of the broker 20 may be secured in the external storage device 910. Further, the computer 900 is connected to the external storage device 920 through the communication interface 905, and the storage area corresponding to the storage medium 110 of the client 10 or the storage medium 210 of the broker 20 may be secured in the external storage device 920.

In at least one embodiment, the auxiliary storage device 903 is an example of a non-transitory tangible medium. Other examples of non-transitory tangible medium include magnetic disks, magneto-optical disks, CD-ROMs, DVD-ROMs, semiconductor memories, and the like connected through the input and output interface 904. Further, when this program is delivered to the computer 900 through a communication line, the computer 900 receiving the delivered program may develop the program in the main storage device 902 and execute the above process.

Further, the program may be for realizing a part of the above-described functions. Further, the program may be a so-called differential file (differential program) which realizes the above-described function in combination with other programs already stored in the auxiliary storage device 903.

Further, the broker 20 and the server 30 may be constituted by one computer 900 or may be constituted by a plurality of computers connected to be communicable.

(Function and Effect)

As described above, the client 10 according to the present embodiment includes a connection processing unit 101 that establishes a connection A for transmitting and receiving urgent messages, and a connection B for transmitting and receiving normal messages, to and from a broker 20; a subscription request unit 102 that designates the urgent messages received using the connection A, and the normal messages received using the connection B, for each topic, among messages received from the broker 20; and a message transmission unit 103 that designates the urgent messages to be transmitted using the connection A, and the normal messages to be transmitted using the connection B, for each topic, among messages to be transmitted to the broker 20.

With such a configuration, even when the broker 20 delivers in a batch the accumulated normal messages after the broker 20 and the client 10 are reconnected, the client 10 can subscribe to the normal messages delivered in a batch using the connection B, in parallel with transmission and reception of urgent messages using the connection A. Therefore, the client 10 can suppress delays in transmission and reception of urgent messages, due to receiving processing of normal messages delivered in a batch.

Further, in the connection process of the connection B, the above-described connection processing unit 101 of the client 10 sets "message accumulation necessity" included in the connection information of the connection B to "necessary" so as to request the broker 20 to accumulate the normal messages that the broker 20 is requested to subscribe to, while the connection B is disconnected.

With such a configuration, while the connection B with the broker 20 is disconnected because the client 10 enters the area out of the wireless communication range, such as underground, the client 10 can store a normal message transmitted from the server 30 or the like in the broker 20. Then, after the client 10 moves to a place where the wireless communication state is stable and the connection B is reconnected, the client 10 receives the accumulated normal messages delivered in a batch from the broker 20, thereby suppressing the missing of the normal message.

On the other hand, the connection processing unit 101 sets "message accumulation necessity" included in the connection information of the connection A as "unnecessary" in the connection process of the connection A, so the urgent message is not accumulated in the broker 20. Therefore, after the connection A is reconnected, the broker 20 does not deliver in a batch the accumulated messages, so the client 10 can immediately transmit and receive the urgent messages without being interrupted by the batch delivery in the connection A.

The above-described client 10 further includes an authentication processing unit 104 that performs authentication with the server 30. After the connection A with the broker 20 is established, the authentication processing unit 104 transmits and receives a message associated with the authentication information topic with the server 30 using the connection A.

With such a configuration, even when the client 10 is receiving normal messages delivered in a batch from the broker 20 using the connection B, the client 10 can transmit and receive urgent messages used for the authentication process with the server using the connection A. Thus, there is no delay in transmission and reception of urgent messages related to the authentication process with the server 30, and it is possible to suppress a failure of processing, such as not completing the authentication process within the requested time.

The above-described broker 20 is connectable to the client 10 and the server 30 through the network, and mediates transmission and reception of messages associated with each topic between the client 10 and the server 30. The broker 20 includes a connection information storage unit 201 that stores as connection information used for connection with the client 10, connection information (client ID and connection type) of a connection A for transmitting and receiving urgent messages, and connection information (client ID and connection type) of a connection B for transmitting and receiving normal messages, for each client 10; a subscription information storage unit 202 that stores subscription information for linking an urgent topic and the connection information of the connection A and subscription information for linking a normal topic and the connection information of the connection B, based on a request of the client 10; and a message delivery unit 203 that based on the subscription information, delivers the urgent messages associated with the urgent topic to the client 10 using the connection A while the connection A is established, delivers the normal messages associated with the normal topic using the connection B while the connection B is established, and accumulates the normal messages associated with the normal topic while the connection B is disconnected.

With such a configuration, while the connection A and the connection B with the client 10 are disconnected, the broker 20 does not accumulate the urgent messages but stores the normal messages. Therefore, after the connection A and the connection B with the client 10 are reconnected, the broker 20 can deliver in a batch the normal messages without performing the batch delivery of the urgent message. As a result, after connection A and connection B with the client 10 are reconnected, the broker 20 can deliver urgent messages using the connection A, while continuing batch delivery of the accumulated normal messages by using the connection B. Therefore, the broker 20 can suppress delay of transmission and reception of urgent messages used for the authentication process, the billing process, and the like, by batch delivery processing of accumulated normal messages.

Although the embodiment of the present invention has been described in detail above, the present invention is not limited to these as long as it does not deviate from the technical idea of the present invention, and some design change and the like are also possible.

For example, in the above-described embodiment, an aspect in which the broker 20 and the server 30 are connected to one wired communication, but the present invention is not limited to this. Two wired communication connections of connection A and connection B may be established between the broker 20 and the server 30. In this case, according to the contents of the message, the server 30 also may transmit and receive an urgent message using the connection A and transmit and receive a normal message using the connection B. As described above, it is possible to further suppress the delay of transmission and reception of a message as soon as possible.

INDUSTRIAL APPLICABILITY

According to the client, the broker, the communication system, the communication method, and the program, which are described above, it is possible to suppress a delay in transmission and reception of messages requiring immediate transmission due to batch delivery processing of accumulated messages executed at the time of reconnection.

REFERENCE SIGNS LIST

1 communication system
10, 10a, 10b, 10c client
101 connection processing unit
102 subscription request unit
103 message transmission unit
104 authentication processing unit
105 connection state monitoring unit
110 storage medium
2 information center
20 broker
200 MQTT function unit
201 connection information storage unit
202 subscription information storage unit
203 message delivery unit
204 client connection monitoring unit
30, 30a, 30b server

The invention claimed is:

1. A client which is connectable to a broker, and transmits and receives messages associated with each topic to and from a server through the broker, the client comprising:
   a CPU; and
   a non-transitory memory that is configured to store a program when executed by the CPU controls the client to:
   establish a first connection for transmitting and receiving a first message among the messages in parallel with a second connection for transmitting and receiving a second message among the messages, with the broker;
   request the broker to subscribe to the first message associated with a first topic, using the first connection, by designating the first topic, and to subscribe to the second message associated with a second topic, using the second connection, by designating the second topic; and
   transmit to the broker, the first message associated with a third topic, using the first connection, and transmits to the broker, the second message associated with a fourth topic, using the second connection.

2. The client according to claim 1,
   wherein the client is configured to request the broker to accumulate the second message that the broker is requested to subscribe to, while the second connection is disconnected.

3. The client according to claim 2, further comprising:
an authentication processing unit that is configured to performs authentication with the server,
wherein after the first connection with the broker is established, the authentication processing unit transmits and receives the first message associated with a topic used for the authentication with the server, using the first connection.

4. The client according to claim 1,
wherein the client is further configured to perform authentication with the server, and
wherein after the first connection with the broker is established, the client is configured to transmit and receives the first message associated with a topic used for the authentication with the server, using the first connection.

5. A communication system comprising:
the client according to claim 1;
a broker comprising a CPU and a non-transitory memory that is configured to store a program when executed by the CPU controls the broker to:
store, as connection information used for connection with the client, connection information of a first connection for transmitting and receiving a first message among the messages, and connection information of a second connection for transmitting and receiving a second message among the messages, for each client, the first connection being connected in parallel with the second connection;
store subscription information for linking a first topic and connection information of the first connection and subscription information for linking a second topic and connection information of the second connection, based on a request of the client;
deliver the first message associated with the first topic to the client using the first connection and the second message associated with the second topic to the client using the second connection based on the subscription information while in parallel while the first connection and the second connection are established; and
accumulate the second message associated with the second topic based on the subscription information while the second connection is disconnected; and
a server that is configured to transmit and receive a message to and from the client through the broker.

6. A broker which is connectable to a client and a server through a network and mediates transmission and reception of messages associated with each topic between the client and the server, the broker comprising:
a CPU; and
a non-transitory memory that is configured to store a program when executed by the CPU controls the broker to:
store, as connection information used for connection with the client, connection information of a first connection for transmitting and receiving a first message among the messages, and connection information of a second connection for transmitting and receiving a second message among the messages, for each client, the first connection being connected in parallel with the second connection;
store subscription information for linking a first topic and connection information of the first connection and subscription information for linking a second topic and connection information of the second connection, based on a request of the client;
deliver the first message associated with the first topic to the client using the first connection based on the subscription information and the second message associated with the second topic to the client using the second connection based on the subscription information in parallel while the first connection and the second connection are established; and
accumulate the second message associated with the second topic based on the subscription information while the second connection is disconnected.

7. A communication method of transmitting and receiving messages for each topic between a client and a server through a broker, the method comprising:
a step of establishing a first connection for transmitting and receiving a first message among the messages in parallel with a second connection for transmitting and receiving a second message among the messages, between the broker and the client;
a step of requesting the broker to subscribe to the first message associated with a first topic, using the first connection, by designating the first topic, and to subscribe to the second message associated with a second topic, using the second connection, by designating the second topic; and
a step of transmitting to the broker, the first message associated with a third topic, using the first connection, and transmitting to the broker, the second message associated with a fourth topic, using the second connection.

8. A non-transitory computer readable medium storing a program that causes a computer of a client which is connectable to a broker and transmits and receives messages for each topic to and from a server through the broker, to function as:
a connection processing unit that establishes a first connection for transmitting and receiving a first message among the messages in parallel with a second connection for transmitting and receiving a second message among the messages, with the broker;
a subscription request unit that requests the broker to subscribe to the first message associated with a first topic, using the first connection, by designating the first topic, and to subscribe to the second message associated with a second topic, using the second connection, by designating the second topic; and
a message transmission unit that transmits to the broker, the first message associated with a third topic, using the first connection, and transmits to the broker, the second message associated with a fourth topic, using the second connection.

* * * * *